(12) United States Patent
Farver et al.

(10) Patent No.: US 11,745,441 B2
(45) Date of Patent: Sep. 5, 2023

(54) FIBER-COMPOSITE BICYCLE FRAME ARTICLE FORMED ON MOLDED MANDREL

(71) Applicant: Argonaut, LLC, Bend, OR (US)

(72) Inventors: Benjamin W. Farver, Bend, OR (US); Steven George Domahidy, Bend, OR (US)

(73) Assignee: ARGONAUT, LLC, Bend, OR (US)

( * ) Notice: Subject to any disclaimer, the term of this patent is extended or adjusted under 35 U.S.C. 154(b) by 454 days.

(21) Appl. No.: 16/890,492

(22) Filed: Jun. 2, 2020

(65) Prior Publication Data

US 2021/0170700 A1 Jun. 10, 2021

Related U.S. Application Data

(60) Provisional application No. 62/944,915, filed on Dec. 6, 2019.

(51) Int. Cl.
B29C 70/42 (2006.01)
B62K 19/16 (2006.01)
(Continued)

(52) U.S. Cl.
CPC .......... B29C 70/42 (2013.01); B29C 33/3842 (2013.01); B29C 33/448 (2013.01);
(Continued)

(58) Field of Classification Search
CPC .............................................. B29L 2031/3091
See application file for complete search history.

(56) References Cited

U.S. PATENT DOCUMENTS

| | | | | |
|---|---|---|---|---|
| 3,577,294 A | * | 5/1971 | David | B29B 15/125 156/173 |
| 4,828,285 A | * | 5/1989 | Foret | B29C 66/1122 280/279 |
| 6,340,509 B1 | * | 1/2002 | Nelson | B62K 19/16 280/281.1 |
| 6,823,578 B2 | * | 11/2004 | Anderson | B64C 1/061 264/512 |
| 7,638,084 B2 | * | 12/2009 | Frankel | B29C 70/446 264/512 |

(Continued)

FOREIGN PATENT DOCUMENTS

| | | | | |
|---|---|---|---|---|
| CN | 107458001 A | * | 12/2017 | ........... B29C 70/446 |
| EP | 2327526 A1 | * | 6/2011 | ............. B29C 33/52 |

(Continued)

*Primary Examiner* — Atul P. Khare
(74) *Attorney, Agent, or Firm* — Alleman Hall Creasman & Tuttle LLP

(57) ABSTRACT

A method for the manufacture of a fiber-composite article for a bicycle frame or other bicycle component uses an outer mold configured to define an outer surface of the fiber-composite article and an inner mold configured to define an inner surface of the fiber-composite article. The method comprises: securing in the inner mold a supportive armature for a space-filling mandrel, the mandrel being configured to occupy a space within the inner surface of the fiber-composite article during lay up and curing of the fiber-composite article; forming the mandrel by injection molding a solidifiable fluid into the inner mold, around the armature, the solidifiable fluid being configured to form a solidified, molded material; applying a fiber composition to the mandrel; securing the mandrel with the fiber composition in the outer mold; heating the fiber composition in the outer mold to form the fiber-composite article and concurrently heating the solidified, molded material. In this manner, the fiber composition is compressed into the outer mold due to expansion of the solidified, molded material.

20 Claims, 5 Drawing Sheets

(51) Int. Cl.
  *B29C 33/38*   (2006.01)
  *B62K 19/18*   (2006.01)
  *B29C 70/54*   (2006.01)
  *B29C 33/44*   (2006.01)
  *B29C 70/44*   (2006.01)
  *B29C 70/72*   (2006.01)
  *B29L 31/30*   (2006.01)

(52) U.S. Cl.
  CPC .......... *B29C 70/446* (2013.01); *B29C 70/541* (2013.01); *B29C 70/72* (2013.01); *B62K 19/16* (2013.01); *B62K 19/18* (2013.01); *B29L 2031/3091* (2013.01)

(56)   References Cited

U.S. PATENT DOCUMENTS

| | | | | |
|---|---|---|---|---|
| 7,712,758 | B2* | 5/2010 | White | B62K 19/16 |
| | | | | 280/281.1 |
| 9,120,525 | B2* | 9/2015 | Colegrove | B29C 45/14786 |
| 10,328,642 | B2* | 6/2019 | Deaville | B29C 70/48 |
| 2006/0244179 | A1* | 11/2006 | Denk | B62K 19/16 |
| | | | | 264/257 |
| 2009/0045541 | A1* | 2/2009 | Lazano | B29C 45/372 |
| | | | | 74/552 |
| 2021/0008765 | A1* | 1/2021 | Connell | B33Y 80/00 |

FOREIGN PATENT DOCUMENTS

| | | | | |
|---|---|---|---|---|
| EP | 2594381 | A1 * | 5/2013 | ............ B29C 33/52 |
| FR | 2684062 | A1 * | 5/1993 | ......... B29C 33/0044 |
| WO | WO-9421438 | A1 * | 9/1994 | ........... B29C 70/446 |

\* cited by examiner

FIBER-COMPOSITE BICYCLE FRAME ARTICLE FORMED ON MOLDED MANDREL

CROSS-REFERENCE TO RELATED APPLICATIONS

This application claims priority to U.S. Provisional patent Application Ser. No. 62/944,915, filed Dec. 6, 2019, the entirety of which is hereby incorporated herein by reference for all purposes.

BACKGROUND

A bicycle frame or other bicycle components may be constructed from a variety of materials. Carbon- and other fiber-composite frames are desirable due to their light weight, high strength, high stiffness, and vibration-damping characteristics. Some fiber-composite bicycle frames are constructed by joining elongate, fiber-composite tubes (top tube, down tube, seat tube, etc.) at fiber-composite receiving joints (bottom bracket joint, head-tube joint, seat-tube joint, etc.). To facilitate customized bicycle-frame manufacture, it may be desirable to form the bicycle frames with variable joint angles, interior sizes and/or shapes, and exterior sizes and/or shapes.

SUMMARY

Some aspects of this disclosure are directed to methods for the manufacture of a fiber-composite article for a bicycle frame or other bicycle component. Such methods use an outer mold configured to define an outer surface of the fiber-composite article and an inner mold configured to define an inner surface of the fiber-composite article. One method comprises: securing in the inner mold a supportive armature for a space-filling mandrel, the mandrel being configured to occupy a space within the inner surface of the fiber-composite article during lay up and curing of the fiber-composite article; forming the mandrel by injection molding a solidifiable fluid into the inner mold, around the armature, the solidifiable fluid being configured to form a solidified, molded material; applying a fiber composition to the mandrel; securing the mandrel with the fiber composition in the outer mold. The method further comprises heating the fiber composition in the outer mold to form the fiber-composite article and concurrently heating the solidified, molded material. In this manner, the fiber composition is compressed into the outer mold due to expansion of the solidified, molded material.

Another method comprises fabricating the inner mold and securing in the inner mold a supportive armature for a space-filling mandrel. The mandrel is configured to occupy a space within the inner surface of the fiber-composite article during lay up and curing of the fiber-composite article. The method further comprises forming the mandrel by injection molding into the inner mold, around the armature; applying a fiber composition to the mandrel; securing the mandrel with the fiber composition in the outer mold; and heating the fiber composition in the outer mold to form the fiber-composite article.

Another aspect of this disclosure is directed to a fiber-composite article for a bicycle frame or other bicycle component. The article comprises an outer surface and an inner surface embossed with a texture of an inner release tape applied to a molded mandrel. The molded mandrel defines the shape of the inner surface.

The Summary above is provided in order to introduce in simplified form a selection of concepts that are further described in the Detailed Description. The Summary is not intended to identify key features or essential features of the claimed subject matter, nor is it intended to be used to limit the scope of the claimed subject matter

DETAILED DESCRIPTION

As noted above, a bicycle frame may include a plurality of elongate tubes coupled by fiber-composite receiving joints. In one approach, a receiving joint is formed in a mold that defines the inner and outer surfaces of the receiving joint. In particular, a portion of the inner surface may be defined by an inflatable bladder or other resilient structure. In some instances, however, lack of rigidity of the resilient structure may result in unacceptable dimensional tolerances for the inner surface of the receiving joint. In some instances, it may be difficult to control the pressure that the resilient structure exerts on the fiber-composite material under curing conditions. Furthermore, the inflatable-bladder may develop folds that allow fiber composition to pool up while curing, causing the texture of the folds (which may be stress inducing) to be transferred to the inner surface the fiber-composite article. Varying the bladder material may reduce the incidence of fold formation in some implementations, but at the expense of additional manufacturing complexity.

Figure 1:
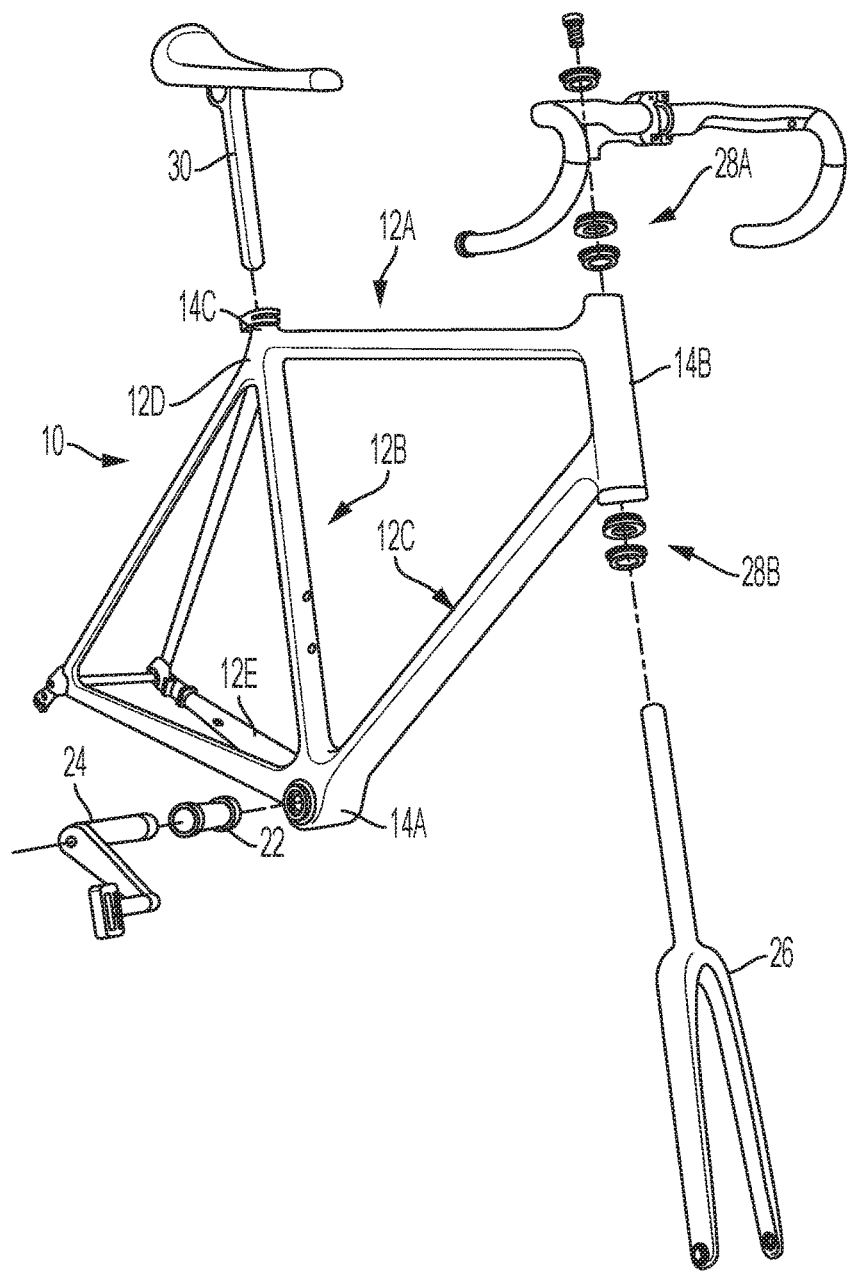
FIG. 1 shows aspects of an example bicycle frame.

FIG. 1 shows aspects of an example bicycle frame 10. The bicycle frame includes a plurality of fiber-composite articles in the form of frame segments 12 and receiving joints 14. The illustrated frame segments include top tube 12A, seat tube 12B, down tube 12C, seatstay 12D, and chainstay 12E.

The illustrated receiving joints include bottom-bracket joint 14A, head-tube joint 14B, and seat-tube joint 14C. Additional articles that may comprise fiber-composite material include a stem or fork.

Figure 2:
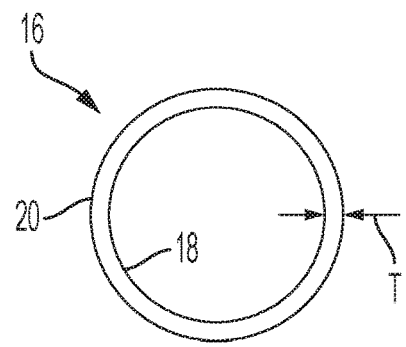
FIG. 2 illustrates a cross section of an example fiber-composite bicycle-frame article.

Any fiber-composite article may include inner and outer surfaces of arbitrary topology. As shown by example in the cross-sectional view of FIG. 2, a fiber-composite article 16, such as a frame segment 12 or receiving joint 14, will generally comprise an inner surface 18 and an outer surface 20. At any locus of a fiber-composite article, the separation between the inner and outer surfaces defines a wall thickness T. The wall thickness may be constant or variable over different loci of the fiber-composite article. In some examples, the wall thickness may be small in comparison to the overall dimensions of the fiber-composite article. For instance, fiber-composite frame segments 12, may span hundreds of millimeters (mm) but have a wall thickness of about 5 mm or less.

In these and other examples, a fiber-composite article may take the form of a relatively thin envelope. A fiber-composite envelope may surround, retain, and/or marshal one or more structural members—tubes, rods, and/or rails, for example—that are received into the inner surface of the fiber-composite article. In the example of FIG. 1: bottom-bracket joint 14A surrounds and retains seat tube 12B, down tube 12C, and chainstay 12E; head-tube joint 14B surrounds and retains top tube 12A and down tube 12C; and seat-tube joint 14C surrounds and retains top tube 12A, seat tube 12B, and seatstay 12D. Alternatively or in addition, a fiber-composite envelope may surround, retain, and/or marshal various mechanical hardware. In the example of FIG. 1: bottom-bracket joint 14A retains, and marshals bottom bracket 22 and spindle 24; head-tube joint 14B retains and marshals fork 26 and headset 28A and 28B; and seat-tube joint 14C retains and marshals seat post 30.

Figure 3:
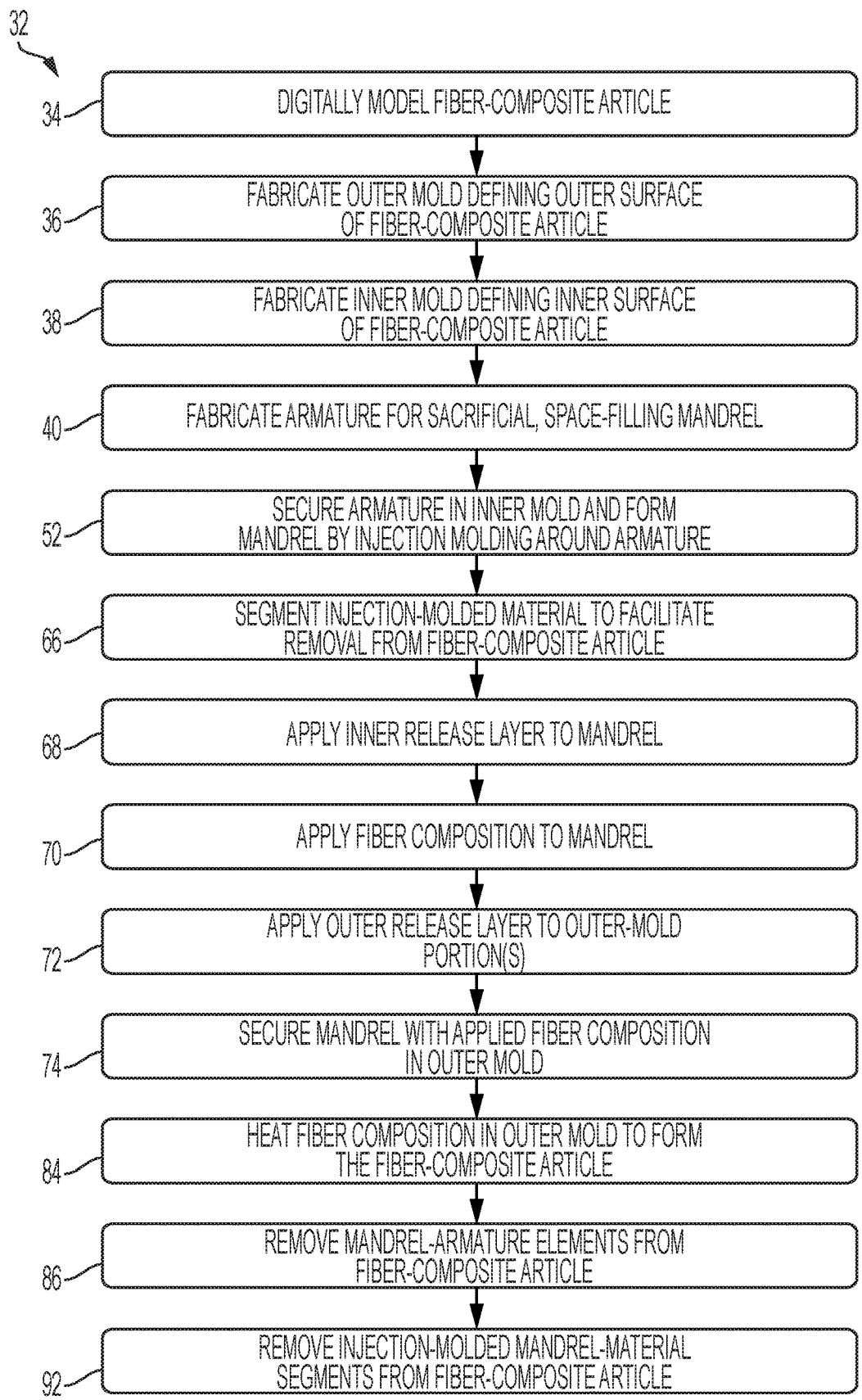
FIG. 3 shows aspects of an example method to manufacture a fiber-composite article.

FIG. 3 shows aspects of an example method 32 to manufacture a fiber-composite article including, but not limited to, the fiber-composite articles described herein. The method employs an outer mold configured to define an outer surface of the fiber-composite article and an inner mold configured to define an inner surface of the fiber-composite article. The method also employs a space-filling mandrel configured to occupy a space within the inner surface of the fiber-composite article during lay up and curing of the fiber-composite article.

At 34 of method 32 a digital model of the desired fiber-composite article is created. The digital model is configured to represent at least the inner and outer surfaces of the fiber-composite article. The digital data structure of the digital model is not particularly limited. The digital model may include one or more CAD files, in some examples. In embodiments where the desired fiber-composite article is a receiving joint of a bicycle frame, the digital model may be customized to provide the desired bicycle-frame geometry and/or ride characteristics.

At 36 an outer mold that defines the outer surface of the fiber-composite article is fabricated according to the digital model created at 34. The outer mold may be fabricated in two or more separable portions that are assembled together to enable molding of a substantially continuous outer surface of the fiber-composite article. In some examples, the outer mold may be subtractively machined (e.g., milled). In some examples, the outer mold may be additively manufactured (e.g., 3D printed). 3D printing, in some instances, may reduce the cost of mold making for short-run bicycle-frame configurations, which may be customized to a rider's desired bicycle-frame geometry and/or ride characteristics. In some examples, the milling and/or 3D printing is controlled automatically according to the features defined in the digital model.

The outer mold may be formed from any material that, in its formed state, is suitably rigid and dimensionally stable over the temperature range at which the fiber-composite article will be cured (vide infra). The outer mold may be formed from a metal or high-temperature thermoplastic or thermosetting polymer, for instance. In some examples, each separable outer-mold portion may include an o-ring groove. In examples in which o-ring grooves are included, the o-ring grooves of opposing separable outer-mold portions may be co-registered. In some examples, at least one outer-mold portion may include a 'flash gap' configured to allow a small amount of resin flow into the o-ring groove during curing, so as to provide substantially leak-free pressurization of the fiber composition while curing (vide infra).

At 38 an inner mold that defines the inner surface of the fiber-composite article is fabricated according to the digital model created at 34. The inner mold may be fabricated in two or more separable portions that are assembled together to enable molding of a substantially continuous inner surface of the fiber-composite article. In some examples, the inner mold may be subtractively machined (e.g., milled). In some examples, the inner mold may be additively manufactured (e.g., 3D printed). 3D printing, in some instances, may reduce the cost of mold making for short-run bicycle-frame configurations, which may be customized to a rider's desired bicycle-frame geometry and/or ride characteristics. In some examples, the milling and/or 3D printing is controlled automatically according to the features defined in the digital model. The inner mold may be formed from any material that, in its formed state, is suitably rigid and dimensionally stable. The inner mold may be formed from a metal or thermoplastic or thermosetting polymer, for instance.

At 40 a supportive armature for a sacrificial, space-filling mandrel is fabricated, the mandrel being configured to occupy the space within the inner surface of the fiber-composite article during the lay up and curing of the fiber-composite article. The armature is a rigid structure. The armature includes a plurality of locating features configured to receive (or, alternatively, to be received into) corresponding locating features of the inner and outer molds. The armature may comprise any rigid material or combination of rigid materials. Examples include steel, aluminum, and high-strength polymer materials, such as polyacetal—e.g., Delrin. Generally speaking, the armature is configured to support the mandrel in the outer mold and to increase the dimensional stability of the mandrel, the balance of which is comprised of an injection-molded polymer material. In some examples, the armature may be configured to provide other manufacturing advantages, as described hereinafter.

Figure 4:
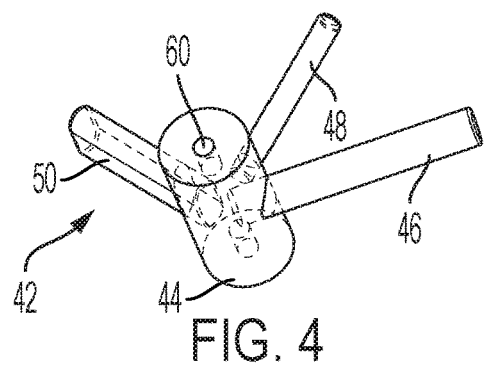
FIG. 4 shows aspects of an example armature suitable for the manufacture of a fiber-composite bottom bracket joint of a bicycle frame.

In some examples, the armature includes one rigid element or a series of rigid elements—e.g., two or more rigid elements detachably coupled to each other. In examples in which the fiber-composite article is a bicycle-frame joint, the one or more rigid elements may include a hub and one or more nubs. The one or more nubs may align to a corresponding one or more segments of the bicycle frame when the hub is positioned in the bicycle-frame joint. FIG. 4 shows aspects of an example armature 42 suitable for the manufacture of a fiber-composite bottom bracket joint of a bicycle frame. In this example, the armature elements align to the different bicycle frame tubes to be received into the fiber-composite article. More particularly, hub 44 is positioned at a bottom bracket position of the bottom bracket joint, nub 46 aligns to a down-tube position, nub 48 aligns to a seat-tube position, and nub 50 aligns to a chainstay position of the bicycle frame. In examples in which the fiber-composite article is a head-tube joint of the bicycle frame, the hub is positioned at a head-tube position of the head-tube joint, and the one or more nubs align to a top tube and a down tube of the bicycle frame. In examples in which the fiber-composite article is a seat-tube joint of the bicycle frame, the hub is positioned at a seat-tube position of the seat-tube joint, and the one or more nubs align to a top tube and a seatstay of the bicycle frame.

Figure 5:
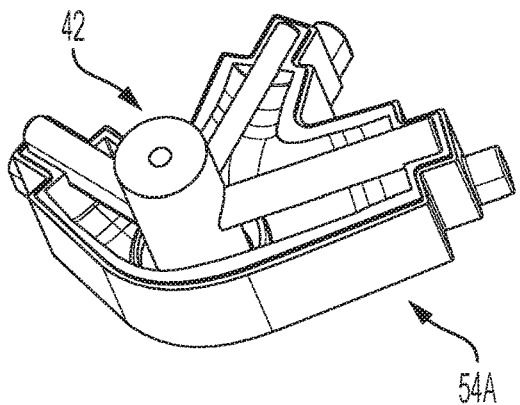
FIG. 5 shows aspects of the example armature of FIG. 4, secured in an example inner-mold portion.

At 52 of FIG. 3, the armature is secured in the inner mold, and the sacrificial, space-filling mandrel is formed by injection molding around the armature, inside the inner mold. The mandrel is the solid structure around which the fiber composition of the fiber-composite article will be layed up. In some examples, the armature may be secured by co-registry of the corresponding locating features of the armature and of the inner mold, as noted above. FIG. 5 shows armature 42 secured in a corresponding inner-mold portion 54A.

The substance injection molded around the armature may include any solidifiable fluid configured to form a solidified, molded material that is substantially dimensionally stable over the temperature range at which the fiber-composite article will be cured. In some examples, the injection-molded material may undergo some amount of thermal expansion when heated from ambient temperature to the temperature range at which the fiber-composite article will be cured (vide infra). In this manner, the injection-molded material may exert pressure on the fiber composition during subsequent molding of the fiber-composite article. In some examples, the desired amount of thermal expansion may be within a range of 1 to 20% by volume. In some examples, the desired amount of thermal expansion may be within a range of 1 to 10% by volume. In some examples, the desired amount of thermal expansion may be within a range of 5 to 10% by volume. Other ranges of thermal expansion are also envisaged.

In some examples, a coefficient of thermal expansion of the solidified, molded material is greater than the coefficient of thermal expansion of the armature. Accordingly, the detailed configuration of the armature may be manipulated as a process variable in order to fine tune the expansion of the mandrel at curing temperatures. More specifically, any increase in the volume occupied by the armature of the mandrel is accompanied by a commensurate decrease in the volume of injection-molded material. Although the injection-molded material may expand significantly when heated, the armature may expand very little, due to its material composition. Accordingly, it is possible to reduce the degree to which the mandrel expands simply by increasing the volume occupied by the armature, without changing the composition of the injection-molded material. In addition, the size and shape of the armature can be engineered so that the negative space within the mandrel that forms upon removal of the armature (vide infra) simplifies removal of the molded mandrel segments as well.

Typically, the solidifiable fluid from which the injection-molded material solidifies comprises a polymerizable and/or cross-linkable component. In some examples, the injection-molded material may comprise silicone (i.e., a polysiloxane). In some examples, the injection-molded material may comprise a polyacrylic or a polyurethane. In some examples, the injection-molded material may be configured to reduce or substantially exclude entrained air. In other examples, however, the solidifiable fluid may comprise a controlled amount of a foaming agent in addition to the polymerizable and/or cross-linkable component.

Figure 6:
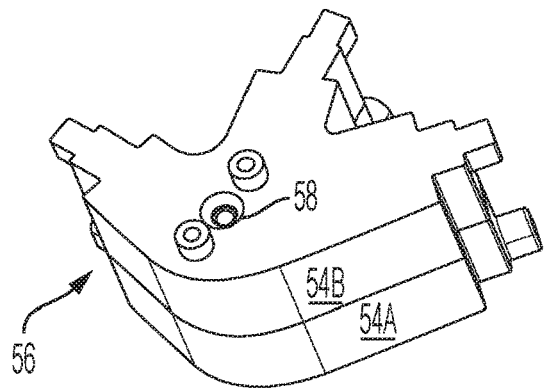
FIG. 6 shows aspects of an example inner mold comprising the inner-mold portion of FIG. 5.

FIG. 6 shows the assembled inner mold 56 comprising inner-mold portions 54A and 54B, which enclose the armature. Both inner-mold portions include a thru-hole 58 configured for a machine screw. Returning briefly to FIG. 4, the machine screw may screw into a screwthread 60 of armature 42 to secure the separable portions 54 of inner mold 56 to armature 42 and thereby secure the separable portions together.

Figure 7:
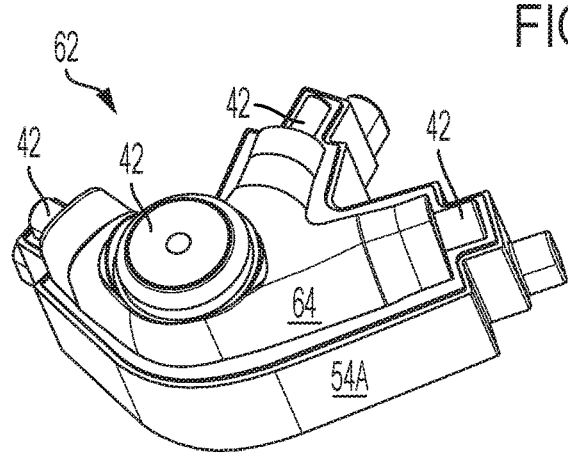
FIGS. 7 and 8 show aspects of an example mandrel formed using the armature of FIG. 4 and the inner mold of FIG. 6.
Figure 8:
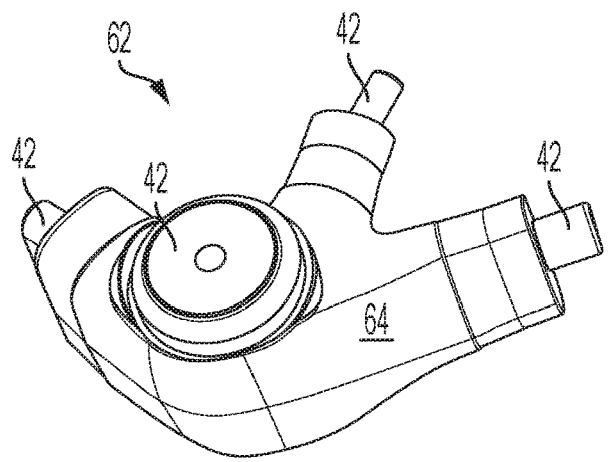

FIG. 7 shows mandrel 62, comprising armature 42 with injection-molded material 64 adhering thereon, after inner-mold portion 54B is lifted away. FIG. 8 shows mandrel 62 after inner-mold portion 54A is lifted away.

At 66 of FIG. 3, the injection-molded material is segmented to facilitate eventual removal of the injection-molded material from the fiber-composite article. In some examples, segmentation of the injection-molded material may include slicing, scoring, and/or perforating the injection-molded material. In some examples, the injection-molded material is sliced so as to quarter the mandrel all the way through to the armature. Additional cuts may be made all the way around certain sections, to aid in removal around hard angles or complex surfaces. The cuts may terminate before the end of each section (e.g., in a range of about one to five millimeters before) in order to prevent the injection-molded material from detaching from the armature prior to, or during, the molding process.

At 68 of FIG. 3, an inner release layer is applied to the mandrel. In some examples, the inner release layer may comprise a fluid lubricant. In some examples, the inner release layer may comprise a release tape, such as poly (tetrafluoroethylene)—e.g., Teflon tape. In some examples, the release tape may be an adhesive tape that allows the injection-molded material to expand during curing of the fiber-composite article but keeps the injection-molded material from sticking to the fiber-composite article. In some examples, the release tape may reduce the transfer of undesired texture (artifacts of machining or 3D printing) from the inner mold onto the inner surface of the fiber-composite article.

At 70 of FIG. 3, a fiber composition is applied to the mandrel. In some examples, the fiber composition comprises a fiber-based textile that includes a curable (i.e., polymerizable and/or cross-linkable) resin. The fiber-based textile may take the form of a relatively narrow strip or tape, for example, which is applied in plural layers. The fibers of the fiber-based textile may comprise one or more natural or synthetic fibers. In some examples, the fibers of the fiber-based textile comprise high-strength carbon fibers. In some examples, the curable resin comprises a thermosetting resin. In some examples, the curable resin is applied externally to the fiber-based textile as the textile is applied to the mandrel. In other examples, the fiber-based textile is supplied with the curable resin already included therein (e.g., resin-impregnated or pre-impregnated carbon-fiber textile). In still other examples, the fiber-based textile may include a thermoplastic—e.g., a high-strength, high-performance thermoplastic such as polyetheretherketone (PEEK).

The quantity of fiber composition applied to mandrel may be such as to fill (but not overfill) the gap between the inner and outer surfaces of the fiber-composite article, as defined, respectively, by the inner and outer molds. In examples in which the fiber composition comprises a fiber-based textile, plural layers of the fiber-based textile may be layed upon and/or wrapped around the mandrel in order to achieve the desired thickness. In some examples, the desired number of layers of the fiber-based textile may be the maximum number that allows the portions of the outer mold to seal with the fiber-coated mandrel inserted between the outer-mold portions.

At 72 of FIG. 3, an outer release layer is applied to any or all of the outer-mold portions. In some examples, the outer release layer may comprise a fluid lubricant, such as a 'mold-release' agent. In some examples, the outer release layer may comprise a release tape, such as poly(tetrafluoroethylene) tape. In some examples, an adhesive-backed mold insert may be used in addition to or in lieu of a fluid lubricant or release tape.

At 74 of FIG. 3, the mandrel with the applied fiber composition is secured in the outer mold. In some examples, the mandrel may be secured by co-registry of the corresponding locating features of the armature and of the outer-mold portions, as noted above. In examples in which the opposing outer-mold portions include an o-ring groove, an o-ring may be inserted in the o-ring groove at this stage of manufacture. An o-ring may also be applied to any armature element that aligns to the o-ring groove, to complete the seal inside the outer-mold cavity. The outer-mold portions are then secured together around the mandrel. The outer-mold portions may be joined under compressive force—e.g., held together using one or more screws or clamps, and/or retained in a vice or press, such as a temperature-controlled press.

Figure 9:
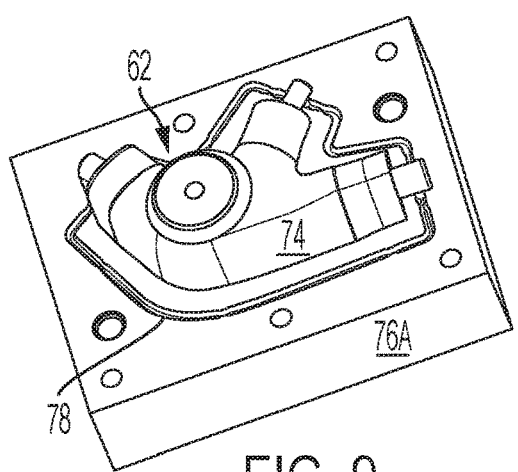
FIG. 9 shows aspects of the mandrel of FIGS. 7 and 8 with an applied fiber composition, secured in an example outer-mold portion.
Figure 10:
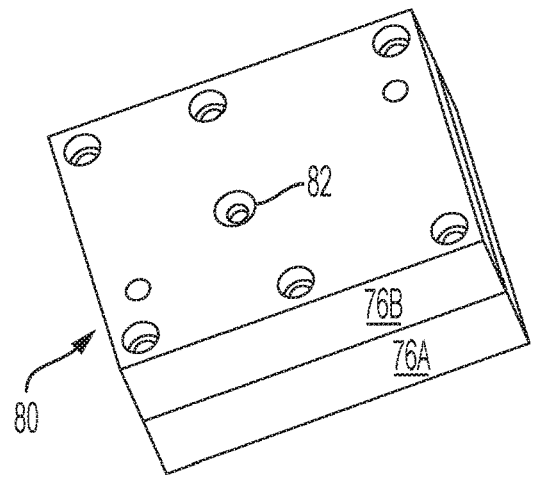
FIG. 10 shows aspects of an example outer mold comprising the outer-mold portion of FIG. 9.

FIG. 9 shows mandrel 62 with the applied fiber composition 74 secured in outer-mold portion 76A. This drawing also shows o-ring groove 78. FIG. 10 shows the assembled outer mold 80 comprising outer-mold portions 76A and 76B, which enclose the mandrel and applied curable fiber composition. Both outer-mold portions include a thru-hole 82 configured for a machine screw. Returning again to FIG. 4, the machine screw may screw into a screwthread 60 of armature 42 to secure the separable portions 76 of outer mold 80 to armature 42 and thereby secure the separable portions together.

At 84 the fiber composition is heated in the outer mold to form the fiber-composite article—e.g., by curing the fiber composition. In particular, the outer mold may be heated to a setpoint curing temperature for a predetermined curing time, in order to effect curing. In some examples, the outer mold is heated in a temperature-controlled oven. In some examples, the outer mold includes temperature-control componentry, such as a heating wire or heating tape and a thermocouple or other temperature sensor. The temperature control componentry may be coupled operatively to an electronic temperature controller and thereby configured to provide the setpoint temperature for the predetermined time. In some examples, as noted above, the outer mold may be retained in a temperature-controlled press that compresses the outer-mold portions and concurrently transfers heat to the outer mold and fiber composition therein. In some examples, a setpoint curing temperature may be between 60 and 180° C., more particularly about 100 to 150° C., and still more particularly, about 135° C. Concurrently, the mandrel including the solidified, molded material is heated. During such heating, the fiber composition is compressed into the outer mold due to expansion of the solidified, molded material. In particular, expansion of the injection-molded material of the mandrel compresses the plural layers of the fiber composition and forces the layers against the outer mold, yielding an adherent and substantially void-free structure having the desired inner and outer topology and desired high strength. After heating, the separable outer-mold portions are separated and the fiber-composite article is released from the outer mold.

Figure 11:
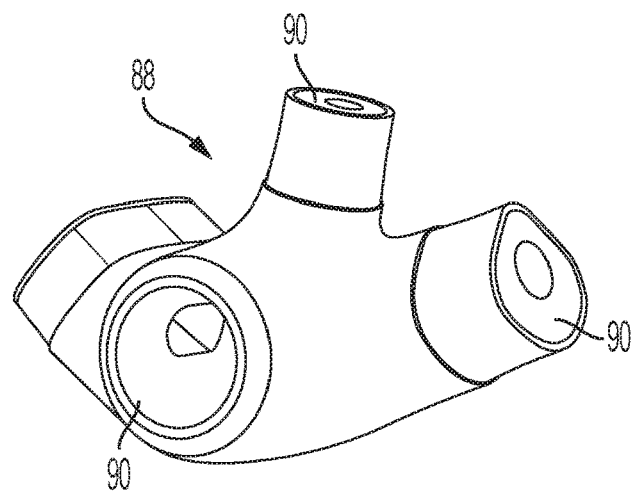
FIG. 11 shows an example fiber-composite article after removal of the elements of the armature of FIG. 4.

At 86 of FIG. 3, the detachable armature elements are separated and removed from the fiber-composite article. In some implementations, the armature elements may be removed in a specific order. For instance, the rods and rails may be removed from their respective nubs, and then the hub may be removed from the injection-molded host. FIG. 11 shows the formed, fiber-composite article 88 after removal of the armature elements. Injection-molded material 90 is still visible in the drawing.

Figure 12:
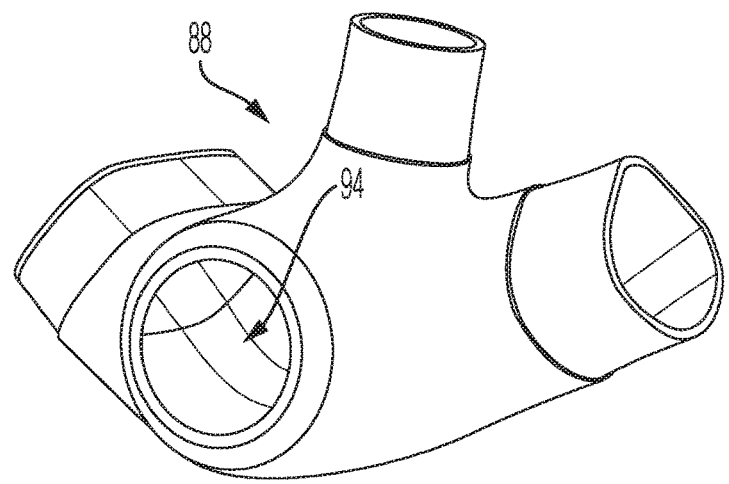
FIG. 12 shows an example fiber-composite article after removal of the armature elements and molded mandrel segments.

At 92 of FIG. 3, the molded mandrel material is removed from the inner surface of the fiber-composite article—e.g., in plural segments if the mandrel has been divided or perforated. When removing the injection-molded material from the fiber-composite article, end portions that were left uncut at 66 may either be cut or ripped off of the fiber-composite article. FIG. 12 shows the formed, fiber-composite article 88 after removal of all armature elements and injection-molded segments of the mandrel. In some examples, the inner surface 94 of the fiber-composite article may be embossed with a texture of an inner release tape applied to the molded mandrel.

Figure 13:
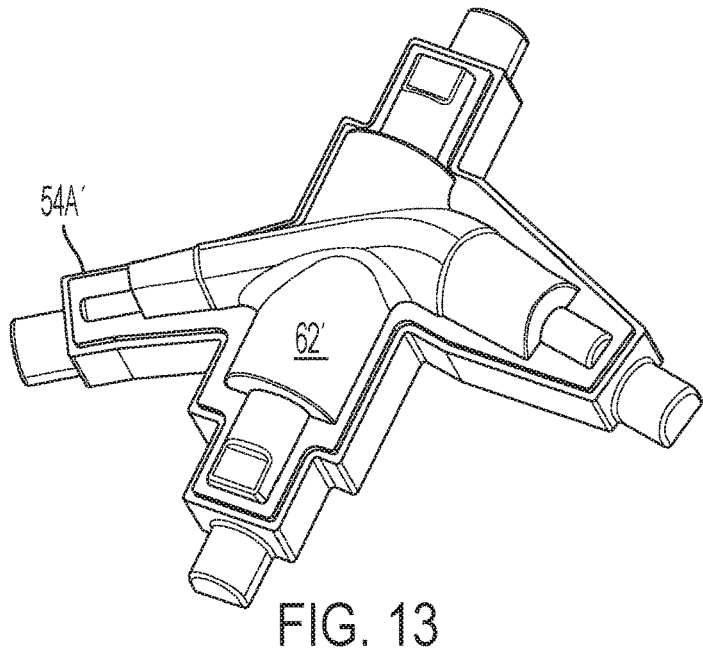
FIG. 13 shows aspects of an example injection-molded mandrel for a seat-tube joint, in a corresponding inner-mold portion.
Figure 14:
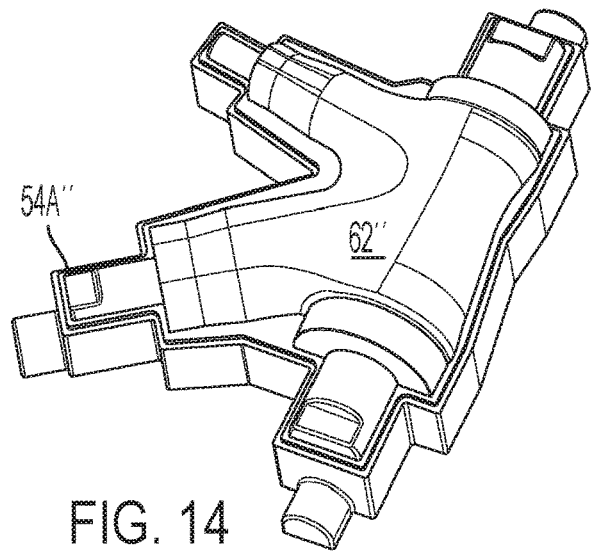
FIG. 14 shows aspects of an example injection-molded mandrel for a head-tube joint, in a corresponding inner-mold portion.

The method of FIG. 3 is equally applicable to other fiber-composite bicycle-frame components besides the bottom-bracket joint shown in FIGS. 4 through 12. FIG. 13 shows an injection-molded mandrel 62' for a seat-tube joint in a corresponding inner-mold portion 54A'. FIG. 14 shows an injection-molded mandrel 62" for a head-tube joint in a corresponding inner-mold portion 54A". It will be noted that fiber-composite receiving joints of a bicycle frame may be joined to the frame tubes or other members in any suitable manner, such as with a resin-based adhesive compatible with the fiber-composite material. Further, the tube nubs that are part of the receiving joints can have mechanical features for facilitating connection to one or more elongate frame tubes (e.g., a segment that protrudes into a frame tube). Further still, the outer size and/or shape of the nubs may be configured to match the tubes so that when joined together, the overall joint construction appears to be monolithic. Despite the emphasis herein on fiber-composite articles for a bicycle-frame, the above method of manufacture can be applied to various bicycle components that are not strictly part of the frame and to virtually any fiber-composite envelope or other article.

It will be understood that the configurations and methods described herein are provided by way of example, and that these examples are not to be considered in a limiting sense because numerous variations, extensions, and omissions are also envisaged. Any of the various acts of an above method may be performed in the sequence illustrated, in other sequences, in parallel, or omitted.

The subject matter of the present disclosure includes all novel and non-obvious combinations and sub-combinations of the various configurations, methods, properties, and other features disclosed herein, as well as any and all equivalents thereof.

The invention claimed is:

1. A method to manufacture a fiber-composite bicycle component using an outer mold configured to define an outer surface of the fiber-composite bicycle component and an inner mold configured to define an inner surface of the fiber-composite bicycle component, the method comprising:
   fabricating the inner mold;
   fabricating a supportive armature for a sacrificial, space-filling mandrel, the armature including a plurality of locating features configured to be received into corresponding locating features of the inner and outer molds;
   securing the armature in the inner mold;

forming the mandrel by injection molding into the inner mold, around the armature, the mandrel being configured to occupy a space within the inner surface of the fiber-composite bicycle component during lay up and curing of the fiber-composite bicycle component;

applying a fiber composition to the mandrel to effect the lay up;

securing the mandrel with the fiber composition in the outer mold; and heating the fiber composition in the outer mold to effect the curing and thereby form the fiber-composite bicycle component.

2. The method of claim 1 wherein the locating features comprise a plurality of nubs extending outwardly from a hub.

3. The method of claim 2 wherein the armature includes a plurality of rigid elements.

4. The method of claim 3 wherein the fiber-composite bicycle component is a bicycle-frame joint, wherein the rigid elements include a hub and a plurality of nubs, and wherein the nubs respectively align to a corresponding one or more segments of a bicycle frame when the hub is positioned in the bicycle-frame joint.

5. The method of claim 4 wherein the fiber-composite bicycle component is a bottom-bracket joint of the bicycle frame, wherein the hub is positioned at a bottom bracket position of the bottom bracket joint, and wherein the nubs respectively align to a down tube, seat tube, and chainstay of the bicycle frame.

6. The method of claim 4 wherein the fiber-composite bicycle component is a head-tube joint of the bicycle frame, wherein the hub is positioned at a head-tube position of the head-tube joint, and wherein the nubs respectively align to a top tube and a down tube of the bicycle frame.

7. The method of claim 4 wherein the fiber-composite bicycle component is a seat-tube joint of the bicycle frame, wherein the hub is positioned at a seat-tube position of the seat-tube joint, and wherein the nubs respectively align to a top tube and a seatstay of the bicycle frame.

8. The method of claim 2 wherein the fiber-composite bicycle component comprises an envelope configured to receive one or more bicycle-frame segments and/or to retain a bicycle part.

9. The method of claim 1 wherein
the mandrel is formed by injection molding a solidifiable fluid into the inner mold, the solidifiable fluid forming a solidified, molded material,
and wherein heating the fiber composition in the outer mold comprises concurrently heating the solidified, molded material, wherein the fiber composition is compressed into the outer mold due to expansion of the solidified, molded material during the concurrent heating of the solidified, molded material.

10. The method of claim 9 wherein a coefficient of thermal expansion of the solidified, molded material is greater than the coefficient of thermal expansion of the armature.

11. The method of claim 9 wherein the solidified, molded material includes a polysiloxane.

12. The method of claim 2 wherein the outer mold includes opposing outer-mold portions having an o-ring groove, and wherein securing the mandrel with the fiber composition in the outer mold includes joining the opposing outer mold portions under compressive force, the method further comprising arranging an o-ring in the o-ring groove.

13. The method of claim 11 wherein the outer mold includes opposing outer-mold portions and an o-ring groove formed in the opposing outer mold portions, and wherein at least one of the opposing outer-mold portions includes a flash gap configured to allow a flow of resin into the o-ring groove during the heating of the fiber composition in the outer mold.

14. The method of claim 1 wherein the fiber-composite bicycle component is one or more of a bicycle-frame segment and a bicycle-frame joint.

15. The method of claim 1 wherein the fiber composition includes a carbon-fiber composition.

16. The method of claim 1 wherein the fiber composition comprises a textile and a curable resin.

17. The method of claim 1 further comprising creating a digital model of the fiber-composite bicycle component that represents at least the inner surface of the fiber-composite bicycle component, wherein fabricating the inner mold includes 3D printing the inner mold according to the digital model.

18. The method of claim 1 further comprising applying a release layer to the mandrel before applying the fiber composition.

19. The method of claim 18 wherein the release layer comprises a release tape, and wherein the inner surface of the fiber-composite bicycle component is embossed with a texture of the release tape.

20. The method of claim 1 further comprising removing molded material of the mandrel in plural segments from the inner surface of the fiber-composite bicycle component.

* * * * *